United States Patent

Schott

[11] Patent Number: 5,818,443
[45] Date of Patent: Oct. 6, 1998

[54] SINGLE STEP COARSE REGISTRATION AND INSPECTION OF CIRCULAR OBJECTS

[75] Inventor: Jean-Pierre Schott, Weston, Mass.

[73] Assignee: Cognex Corporation, Natick, Mass.

[21] Appl. No.: 643,174

[22] Filed: May 6, 1996

[51] Int. Cl.$^6$ .................................................. G06K 9/00
[52] U.S. Cl. ................................................................ 382/141
[58] Field of Search ................................. 382/169, 170, 382/171, 172, 151, 159, 209, 220, 221, 289, 294, 293, 144, 145

[56] References Cited

U.S. PATENT DOCUMENTS

| | | | |
|---|---|---|---|
| 4,972,359 | 11/1990 | Silver et al. | 364/728.05 |
| 4,975,972 | 12/1990 | Bose et al. | 382/8 |
| 5,058,200 | 10/1991 | Huang et al. | 455/33 |
| 5,095,204 | 3/1992 | Novini | 250/223 B |
| 5,311,598 | 5/1994 | Bose et al. | 382/8 |
| 5,353,357 | 10/1994 | Longest, Jr. et al. | 382/8 |
| 5,481,620 | 1/1996 | Vaidyanathan | 382/169 |
| 5,500,732 | 3/1996 | Ebel et al. | 356/124 |
| 5,588,071 | 12/1996 | Schultz | 382/168 |
| 5,592,286 | 1/1997 | Fedor | 356/240 |
| 5,671,290 | 9/1997 | Vaidyanathan | 382/133 |
| 5,673,334 | 9/1997 | Nichani et al. | 382/143 |

OTHER PUBLICATIONS

Golden Template Comparison, *Vision Software/GTC*, pp. 43–45, Jun. 1990.
Polar Coordinate Vision Tools, *Cognex 2000/3000/4000/5000 Vision Tools*, Rev.6.0, pp. 8–1 –8–24, 1993.
Projection Tools, *Cognex 3000/4000/5000, Image Processing*, Rev. 7.4, pp. 342–366, 1996.
Practical Golden Template Comparison, *Cognex Corporation*, pp. 2–11 and Figs. 1–8, Jun. 1990.
J.N. Kapur, et al., "A New Method for Grey–Level Picture Thresholding Using the Entropy of the Histogram", Comp. Graphics and Image Processing, vol. 29, pp. 273–285, 1985.
S.K. Pal, et al., "Entropic Thresholding", Signal Processing, vol. 16, pp. 97–108, 1989.

*Primary Examiner*—Jose L. Couso
*Attorney, Agent, or Firm*—Brian L. Michaelis; Russ Weinzimmer

[57] ABSTRACT

A very fast, memory efficient, single-step solution for coarse alignment with determination of angular displacement, and inspection for surface defects on circular objects with non-symmetric patterns and random orientation is described. A suitable geometric partition model of an image is constructed that includes a plurality of spatial bins that can be used for rotation estimation and defect detection. In one embodiment for inspection of circular objects, the geometric partitioning includes 256 spatial bins constituted by concentric circular rings divided into sectors. The number of sectors and thickness of the rings are such that the approximate number of pixels in each region is the same. A set of numbers that encode rotational position and gray level information on the plurality of spatial bins of a reference object are acquired during training and used during run-time wherein the same information relative to a circular object being inspected is computed, and the data are correlated to determine both the coarse rotation and gray level difference in pertinent ones of the plurality of spatial bins.

11 Claims, 6 Drawing Sheets

SINGLE STEP COARSE REGISTRATION AND INSPECTION OF CIRCULAR OBJECTS

FIELD OF THE INVENTION

The present invention relates to machine vision systems, and more particularly to machine vision systems for inspection of circular objects.

BACKGROUND OF THE INVENTION

Machine vision systems are known for use in high speed industrial inspection of circular objects, such as bottle caps or buttons. In order to inspect the circular objects for defects, an image of each object is captured during "run-time" and compared to a known reference template or "golden sample" of the object acquired preliminarily during "training" of the machine vision system. To make an effective comparison of the captured run-time image to the golden sample image, the position of the object to be inspected must be determined within the context of a 2-dimensional coordinate system, i.e. the object to be inspected must be "fixtured" precisely in both X and Y directions. Further, an angular displacement of the circular object must be determined. Then, a comparison can be made between grey values of the object at the given location and angular displacement, and grey values of the trained or stored template at the same position and angular displacement, as known in the art.

In such a machine vision system application, the circular objects or samples are typically moving on a conveyor belt with lateral guides. The lateral guides define a limited longitudinal path along which the circular samples to be inspected will travel, ensuring a coarse lateral fixturing of the samples, effectively fixing the position of the samples in the x-direction. As the samples move longitudinally along the conveyor, a strobe is typically triggered to acquire an image of each sample as it is moved into a fixed position, ensuring coarse longitudinal fixturing, effectively fixing the position of the sample in the y-direction. Fine X, Y fixturing of the circular objects is achieved rapidly by means such as vision caliper software, e.g. the CALIPER TOOL sold by COGNEX CORPORATION, Natick, Mass., which effects the function of mechanical calipers, as known in the art. The vision calipers determine the fine x, y position of the object.

Circular samples typically have random angular orientation and include designs or patterns that are not circularly symmetric. Some mechanism is required to determine and fix the angular orientation of the circular object, prior to inspection. The accurate determination of the angular displacement of the object, and the subsequent inspection thereof, is presently achieved using known algorithms that effect these operations as two or more distinct steps. However, implementation of such known algorithms is computationally and resource intensive, typically requiring significant amounts of processor overhead and large amounts of memory.

For instance, one prior art implementation of an inspection system for circular objects requires at least two separate steps in addition to the common training and X, Y fixturing steps. In even the most efficient implementation(s) known in the prior art, separate, elaborate, and time and resource intensive processes are required for determination of angular displacement and subsequent defect detection of the sample at the determined angle.

In a typical first process, accurate computation of the angular displacement of circular objects is determined by using a polar search approach known in the art. In this method, first a grey image of a predetermined annulus of the circular object is unwrapped or converted/unrolled by digital resampling into a rectangular grey level region. Next, standard grey level normalized correlation is used to measure the linear offset of the converted run-time pattern with respect to a reference pattern stored during training. Finally, after the linear offset is determined, it is transformed by a rectangular to polar conversion into an angular displacement of the original image.

The subsequent process of inspection for defects is substantially accurately achieved by a Golden Template Comparison (GTC)-like method, known in the art, performed on the digitally rotated image(s) using the found angular displacement of the original image. This subsequent inspection process typically involves a computationally intensive precise digital rotation and comparison of the run-time image with a single stored template of the object at a given angle (computationally expensive). Alternatively, comparison is effected in known storage intensive implementations by comparing a captured, un-rotated version of the sample object with a template having a substantially equivalent angular displacement. The template used for comparison purposes is selected from a plurality of stored templates, each stored template being of a different angular displacment, stored in off-line storage (storage expensive).

In any event, once the angular displacement of the object is determined, precise pixel by pixel comparison between the run-time sample and a stored or computed template at the determined rotation is possible to effect inspection, but a lot of time and resources are required for these operations. The two serially implemented techniques are very slow, taking on the order of hundreds of milliseconds for a moderate image size. In addition to the high overhead and computing cost involved in known implementations for inspection of circular objects, memory storage costs are very high, making known storage intensive implementations even more disadvantageous. Accordingly, prior art methods and apparatus for registration and inspection of circular objects are time consuming and resource intensive.

The problems in the prior art are exacerbated by the reality that current applications have very high throughput requirements, on the order of 1000 to 3000 units per minute, and require the storage of template data for anywhere from 10 to 200 different objects. Furthermore, typical bottlecap manufacturing plants, for example, require very fast switchover times to enable the same vision systems to be used for the inspection of various types of objects. Typical implementations require hundreds of megabytes of template storage and many vision systems in parallel to achieve the required throughput.

SUMMARY OF THE INVENTION

The present invention provides a very fast, memory-efficient, single-step solution for coarse alignment with determination of object angular displacement, and inspection for surface defects on circular objects with non-symmetric patterns and random angular displacement.

According to the invention, a geometric partitioning of an image includes a plurality of spatial bins or regions for estimating rotation and for defect detection. In one embodiment for inspection of circular objects the geometric partitioning comprises 256 spatial bins, each bin being a sector of one concentric circular ring of a plurality of concentric circular rings. The number of sectors and thickness of the rings are such that the approximate number of pixels in each sector is the same.

Angular displacement and grey-level information for a plurality of spatial bins representing a reference object are acquired during training and used during run-time wherein the same information relative to a circular object being inspected is computed. An intensity histogram is optionally generated for the reference object at train-time for comparison with an intensity histogram of the object being inspected. A spatial histogram of the grey image is also generated during train-time in accordance with the geometric partitioning. The geometrically partitioned image is of the same size as the grey image of the object being inspected and defines the plurality of spatial bins or regions for purposes of angular displacement determination. The value of pixels of the grey image for each region are summed and optionally normalized by the number of pixels in each bin. The simultaneous angular registration or orientation determination and inspection is achieved by deriving data in accordance with the specific geometric partitioning, and the data are aligned and compared to determine both the coarse rotation and grey level difference in pertinent ones of the plurality of spatial bins.

Features of the invention include a highly efficient inspection process with inspection times in the low tens of milliseconds using the single step technique according to the invention, as opposed to prior art implementations that typically require hundreds of milliseconds to run. A low-storage solution for coarse industrial inspection of circular objects such as bottle caps or buttons is provided. The inspection method and apparatus according to the invention meets very high throughput requirements while minimizing storage requirements.

BRIEF DESCRIPTION OF THE DRAWINGS

These and other features and advantages of the present invention will become more apparent from the following detailed description taken in conjunction with the accompanying drawing in which.

DETAILED DESCRIPTION

A method and apparatus effecting substantially simultaneous registration and inspection of circular objects according to the invention requires the determination of a suitable geometric partitioning of an image of the circular object(s) being inspected, that can be used for rotation estimation and defects detection. The geometric partitioning so determined provides specific data relative to a golden sample or trained image when processed in accordance with a particular train-time mechanism, and provides similar data relative to an object being inspected for comparison purposes when the geometric partitioning is processed in accordance with a particular run-time mechanism, as described hereinafter. The train-time mechanism computes information and characteristic signatures from the golden sample and the run-time mechanism computes similar information and signatures from the object being inspected. The run time information and signatures are compared to the train-time information and signatures to determine the object rotation and surface defects in a single step.

In the present illustrative embodiment, geometric partitioning, the train-time mechanism and the run-time mechanism are effected using Cognex Vision Tools and technology, such as provided in Cognex 2000, 3000 and 4000 Series machine vision systems available from Cognex Corporation, Natick, Mass. However, it will be appreciated that other vision systems and/or general purpose computers may be implemented to effect single step object rotation and defect inspection according to the invention.

Figure 1A:
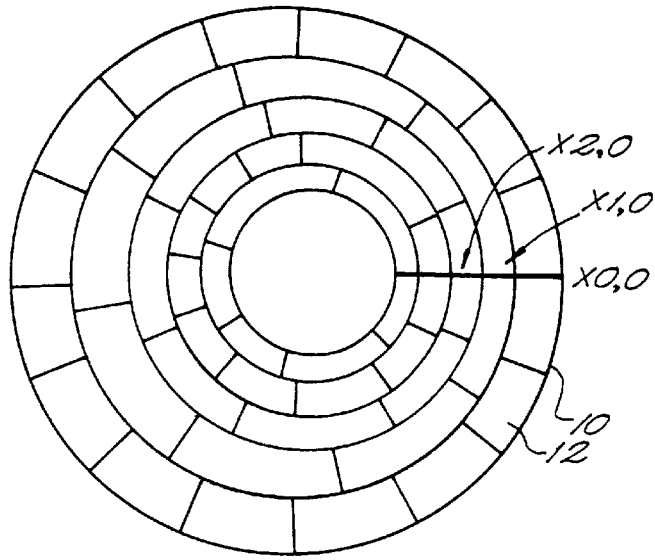
FIG. 1A is an illustration of geometric partitioning of a circular object into a series of concentric rings divided into sectors, according to the invention.

Geometric partitioning of the image of the circular object(s) being inspected and used for rotation estimation and defect detection in the present illustrative embodiment is illustrated in FIG. 1A. The geometric partitioning is comprised of concentric, circular rings 10 divided into sectors 12. The number of sectors and thickness of the rings are selected so that the approximate number of pixels in each region or "spatial bin" is the same. Geometric partitioning divides the image into bins or regions in order to process the grey level pixel information associated with each bin, as described hereinafter, for purposes of both rotation determination and defect inspection. It is desirable to maintain an approximately constant number of pixels in each region if the area to inspect has an isotropic distribution of features to inspect for defects, so that the content of information to be analyzed is substantially equally distributed. However, if some area of the circular object(s) being inspected has no grey level information, these areas can be incorporated into a larger region. Alternatively, areas where there is no useful grey level information can all be lumped into a single catch-all bin.

The geometric partitioning for the circular object is computed, taking the aforementioned into consideration, according to the following equations, used to determine the size or area of each concentric ring or annulus and the size of respective sectors.

For a given radius $R_i$ and $R_{i+1}$, the area of the circular annulus is:

$$\text{Area}_{R_i R_{i+1}} = 2\pi(R_{i+1}^2 - R_i^2) \qquad \text{eq. (1)}$$

For a given radius, $R_i$ and $R_{i+1}$, the area of a sector $\lambda_i$, is:

$$\text{Area}_{R_i R_{i+1} \lambda} = \frac{\pi}{\lambda_i}(R_{i+1}^2 - R_i^2) \qquad \text{eq (2)}$$

If the maximal radius of the circular object is R, the total area is:

$$\text{Area} = 2\pi R^2 \qquad \text{eq. (3)}$$

The total number of available bins in this illustrative embodiment is 256 for the entire area, i.e., in order to have a constant number of pixels per bin, the various radii and angular widths must conform to the following equation:

$$\frac{R2}{\sum_{i=0}^{n-1} \frac{1}{\lambda_i} (R_{i+1}^2 - R_i^2)} = 256 \qquad eq(4)$$

where $R_0$ is the smallest inner radius and $R_n$ is maximal radius R.

The foregoing particular methodology is implemented to determine radii of each annulus and number of sectors in each annulus. The previous equation, eq(4), illustrates that there are many degrees of freedom to adjust the size of each radius and the number of angular bins or sectors 12 per annulus or concentric ring 10. It should be appreciated that to increase the rotational accuracy determination, the number of sectors per annulus can be increased. Generally, the number of sectors in each annulus should be chosen in order to achieve a required angular resolution needed for the rotation determination in a particular application. The width of each sector can be determined iteratively to satisfy the previous equation, eq(4).

Alternatively, a number n of uniform width annuli can be fixed, wherein the width of each annulus AR is given by:

$$\Delta R = \frac{R - R_0}{n} \qquad eq(5)$$

accordingly, the previous equation eq(4) simplifies to;

$$\frac{R^2}{256} = \sum_{i=0}^{n-1} \frac{\Delta R}{\lambda_i} (2(R + i\Delta R) + \Delta R) \qquad eq(6)$$

where the $\lambda_1$ is the only unknown variable.

Figure 1B:
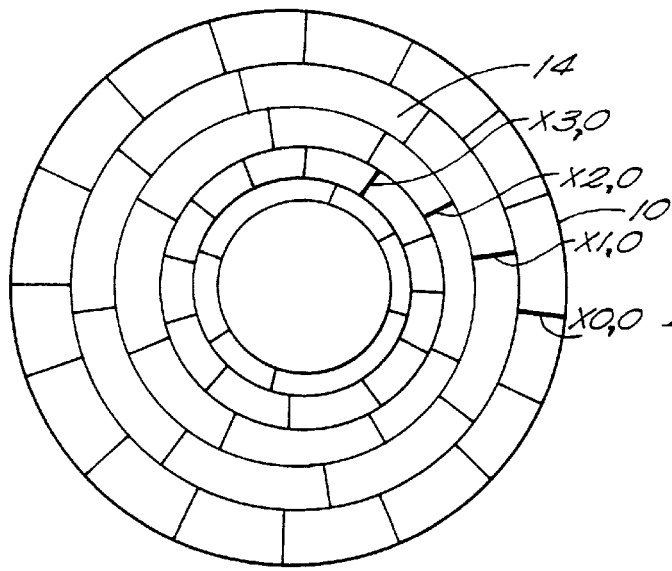
FIG. 1B is an illustration of the geometric partitioning of FIG. 1A having the sectors of the concentric rings offset to enhance angular resolution.
Figure 1C:
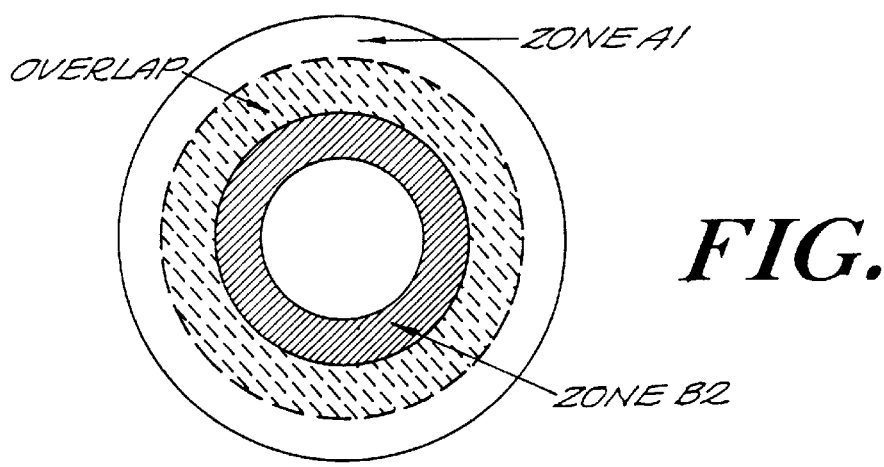
FIG. 1C is an illustration of a geometric partitioning of a two pass partitioning of the circular object having overlapping concentric rings.

It is desirable that each concentric ring have substantially the same width, as well as substantially the same number of pixels. It should be noted that the depiction of the concentric rings in FIGS. 1A–1C is not to scale, nor are the rings and sectors all shown. For the sake of simplicity, the rings and sectors near the center of the circular partitioning are not shown.

It is most desirable that the number of sectors, or bins, in the outermost ring be selected to provide the highest practicable resolution for purposes of determination of angular displacement. The angular displacement determination is a function of the number of sectors or bins, as it is a function of the number of degrees of each substantially equivalent arc of the outermost concentric ring. For example, if there are only four sectors in the outermost ring, the coarse angular resolution or registration of the circular object can only be determined with a degree of accuracy that is +/– approximately 90 degrees. If there are ten sectors defined in the outermost ring, then the level of precision of the coarse angular displacement determination is approximately +/– 36 degrees. In the illustrative embodiment disclosed herein, a reasonable precision for angular displacement is approximately 15 degrees, and the number of sectors or bins in the outermost ring is selected accordingly to be 24.

To facilitate higher accuracy for determination of angular position, the first sector of each ring is constructed to include a compensation offset. The compensation offset is a known amount by which the start of a ring is angularly shifted or offset with respect to an arbitrary zero degree reference vector. That is, as illustrated in FIG. 1B, the angular start X1,0 of the second inner ring 14 is offset by a known amount from the start of the rings adjacent to it, e.g. the start X1,0 of the outermost ring 10. The compensation offset, introduced during the computation of the initial geometric partitioning, is used to increase the angular resolution of the estimated rotation angle, i.e. the difference in angular positioning of the circular run-time image to the trained image, by estimating a rotation angle for each concentric annulus that has meaningful data, and interpolating, as described hereinafter, a final estimated rotation angle using each ring rotation estimate and initial offset. In this manner, the angular displacement estimate from a reference can be refined as a function of the angular offset and number of bins in a ring.

As appreciated in the machine vision system art, an image of an object is divided up into a plurality of pixels. Each of the pixels represents a discrete area of the image, and can have a value associated with it that is indicative of some characteristic, such as a grey level value as known in the art. The quality of the rotation estimate depends heavily on the determination of the exact center of the circular object, i.e., the x and y fixturing and the exact position of an identifiable pixel. In order to improve the robustness of the registration and inspection mechanism, and to compensate for the possibility of a slightly off-center part, overlapping rings can be used, as illustrated in FIG. 1C, so that data that are not strictly centered contribute to two successive rings. The overlapping rings each share some common data and compensate for the inability to identify any single pixel as the exact center. The enhancement to the registration and inspection mechanism contributed by the off-center data depends on the percentage of overlap of the rings. The greater the amount of overlap, the greater the ability to correlate the data acquired from successive rings.

The overlap can be achieved in two passes with two different partition models that partition the circular object with rings that overlap. As illustrated in FIG. 1C, a zone A1 represents a particular ring of a first partition model computed on a first pass, while a zone B2 represents a particular ring of a second partition model computed on a second pass. First and second passes are required in this particular implementation because of the inability of the illustrative hardware to define each bin with two separate labels. The geometric definition of the rings is such that zones A1 and B2 spatially overlap and the two separate passes use the data in the overlap zone for an inner ring of the second partition model and an outer ring of the first partition model. The data acquired is stored separately as described hereinafter, and ultimately added or averaged to arrive at compensated data. Thus, even though the center may be slightly off, valid data will be used in the registration and inspection process.

In this illustrative embodiment, the characteristics of the rings and sectors is selected to provide 256 sectors or spatial bins, total. The number selected, i.e. 256, is a function of the size of particular fixed arrays available in the hardware on which this illustrative embodiment of the invention is implemented. Specifically, the preferred vision system hardware for implementing the method and apparatus according to the invention, is Cognex 3000, 4000 or 5000 series system(s) including a VC1 or VC3 processor. The particulars of the VC1 processor are described in U.S. Pat. No. 4,972,359, issued on Nov. 20, 1990, which is incorporated herein by reference. The illustrative Cognex processor is configured to run Cognex vision tools including Cognex model projection software known as Labeled Projection Tool, described in COGNEX 3000/4000/5000 PROGRAMMABLE VISION ENGINES Vision Tools, publication number 590-0136, which is incorporated herein by reference.

Figure 2:
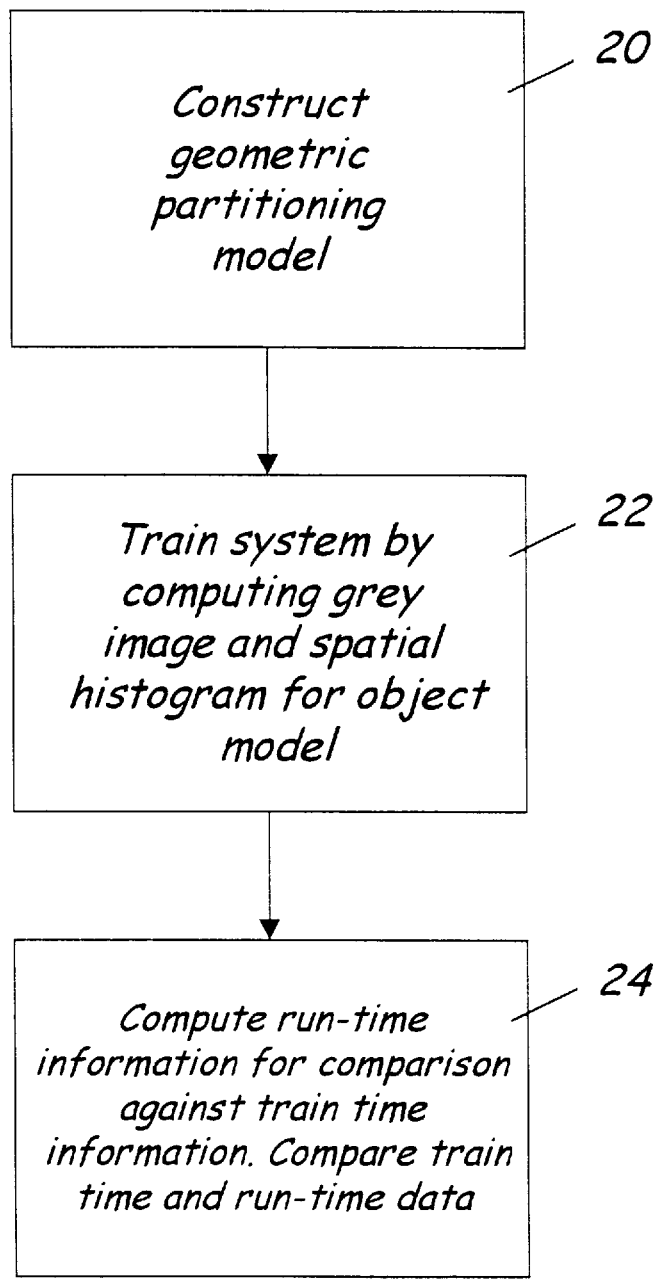
FIG. 2 is a block diagram of a generalized overview of the method for single step registration and inspection of circular objects according to the invention.

A generalized overview of the single step registration and inspection process is illustrated in FIG. 2. Initially it is necessary to construct a geometric partition model of the object 20, as discussed in detail hereinbefore. The process generally further involves significant front end preparation which substantially minimizes the time required to perform actual inspection of an object during run-time. Subsequent to the construction of an appropriate geometric partition model, such front end preparation is effected in the form of a train-time process 22 or training methodology.

Figure 4:
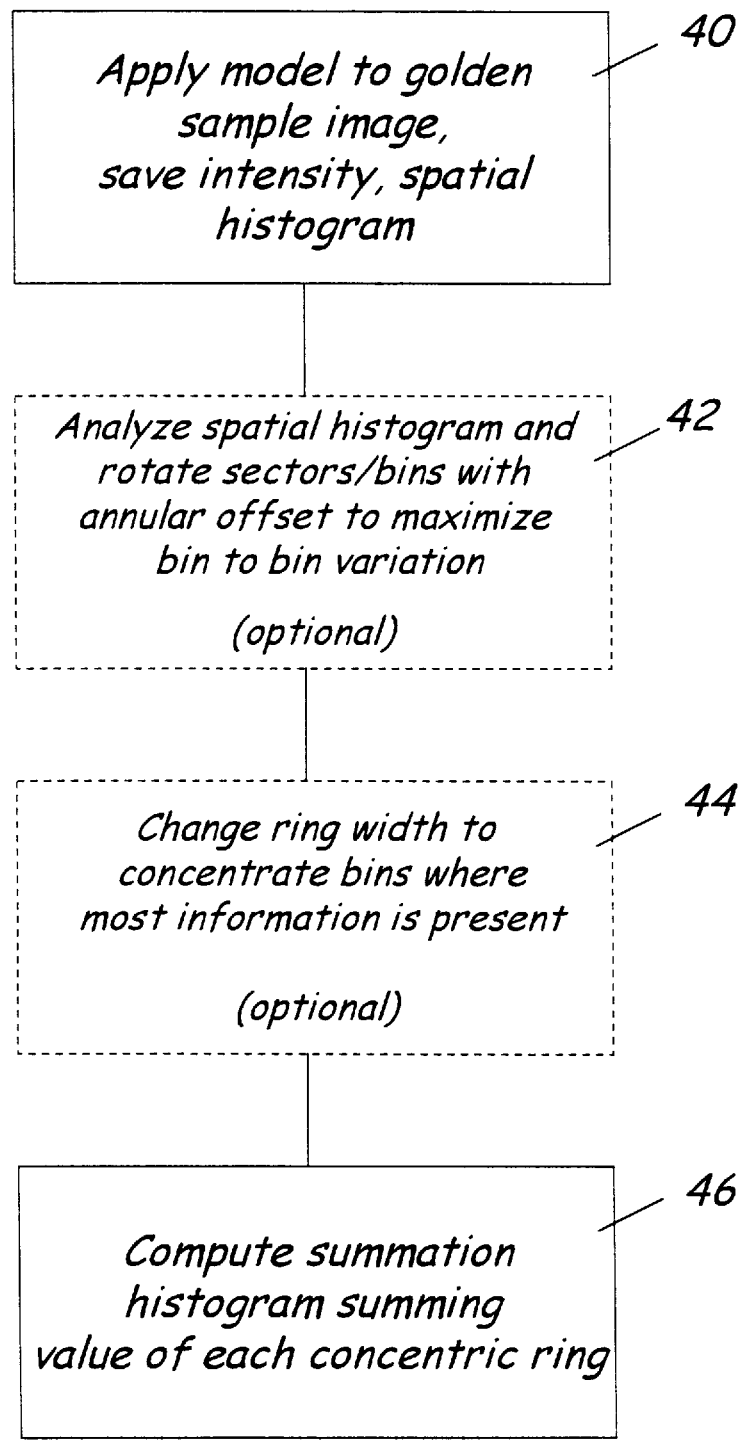
FIG. 4 is a flow diagram of a training process of the single step coarse registration and inspection of circular objects according to the invention.

The training methodology 22, described in detail hereinafter with respect to FIG. 4, generally involves producing an intensity histogram and a spatial histogram of a golden sample or standard, defect free object in accordance with the geometric partitioning specified. The intensity histogram, as known in the art, provides information relating to grey level values of the various pixels comprising the image. A grey level value as understood by those skilled in the art is a numerical value (in this case between 0 and 255) assigned to a given pixel to define its particular gradation between black (assigned 0) and white (assigned 255). The spatial histogram, in this application is a specific labeled projection, as described in the referenced Cognex Projection Tool publication, wherein the label specifies the spatial location of pixels and the histogram provides the sum of the grey level values of pixels in the respective bin associated with the respective label. The intensity histogram and spatial histogram are stored in respective arrays having array elements for each of the 256 bins defined in the geometric partitioning. A summation histogram representing the sum of the bins of the spatial histogram for each of the concentric rings defined in the geometric partition model is also computed and stored for use in run-time.

After the training process 22, a run-time process 24 is effected, as described in detail hereinafter with respect to FIG. 5. The run-time process generally applies the geometric partitioning to a captured image of a circular object being inspected to compute a run-time spatial histogram, and optionally an intensity histogram. The intensity histogram is not used for registration purposes, but is used for an initial coarse defect detection as described hereinafter. A run-time summation histogram is computed to sum up the rings of the spatial histogram. Generally, the run-time information is correlated to the train-time information and a difference of the train-time and run-time histograms is computed to ascertain defects in each bin.

Figure 3:
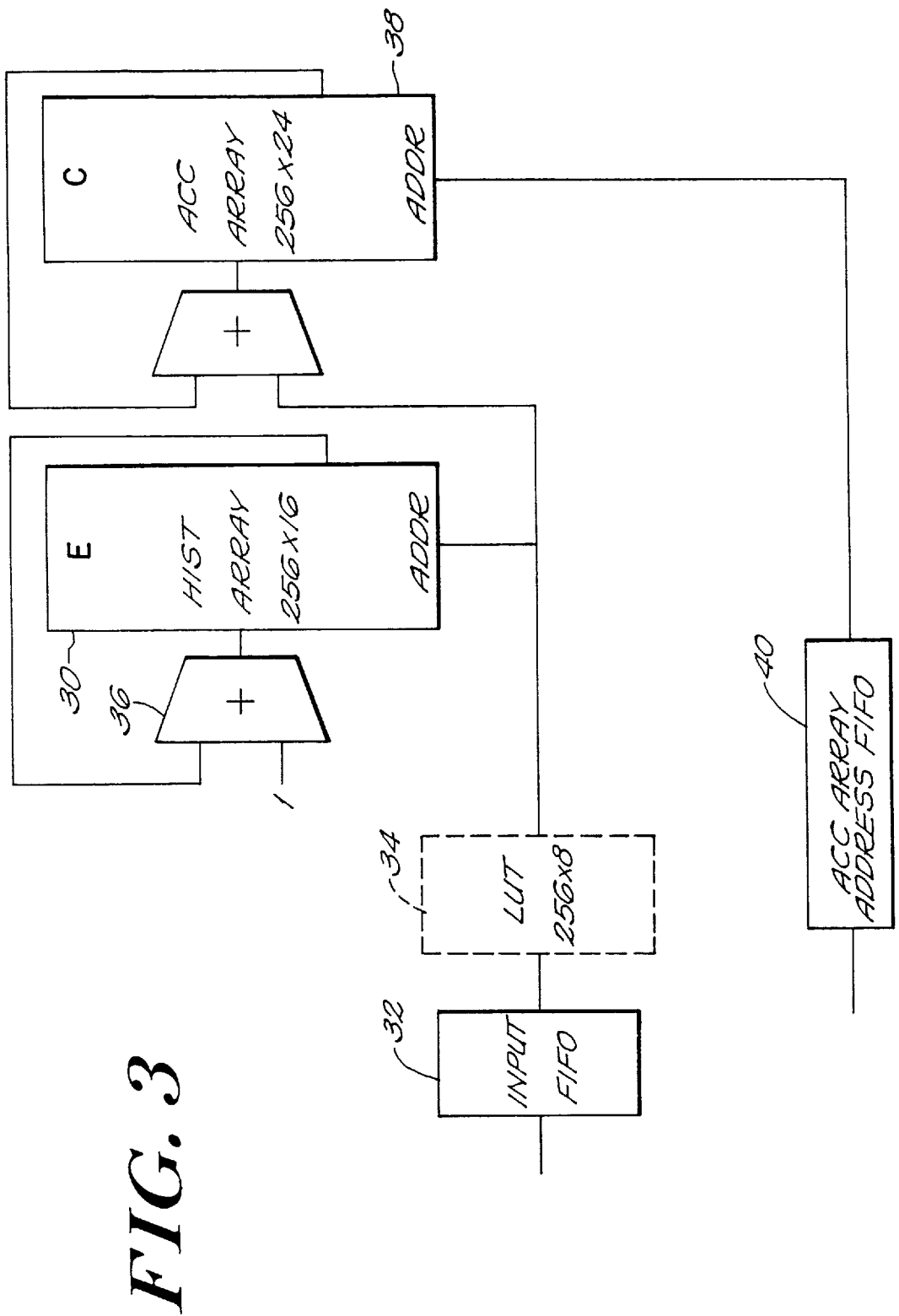
FIG. 3 is a simplified block diagrammatic representation of elements for generating an intensity histogram and a spatial histogram in the single step coarse registration and inspection of circular objects according to the invention.

Referring now to FIG. 3, a simplified block diagram illustrates the hardware configuration for effecting the generation of intensity and spatial histograms used in the concurrent registration and inspection of circular objects according to the invention. The hardware configuration, and generally the registration and inspection mechanism, takes advantage of the architecture of Cognex's VC1 or VC3 processor (although other general purpose hardware and software can be implemented accordingly). Similarly, the mechanism utilizes capabilities of Cognex vision tools including labeled projection software to effect label-based projection as known in the art.

In computing the intensity histogram during training, and optionally during run-time, a first array 30 (the "E" array) is set to zero. Grey values, representing the acquired image or acquired masked image acquired via image acquisition technology as known in the art, are fed into the E array 30 through an input First-In-First-Out register ("FIFO") 32. The grey values can be optionally mapped by an input look-up table 34 whereupon the mapped values are used as addresses of the E array 30. The E array 30 includes an associated autoincrement mechanism 36 that increments by one either the contents of the array element or the contents of the location pointed to by the mapped value if the look-up table 34 is used. When all of the pixels' grey level information have been input, the E array 30 contains the intensity histogram for the golden sample image. Each E array element represents a grey level value bin, having an address of 0–255, which contains a value equal to the quantity of pixels that have a grey level value corresponding to the respective bin address.

In computing the spatial histogram, during training and run-time, a second array (the "C" array) 38 is set to zero. For each pixel in the image (train-time or run-time), the pixel grey level is fed through the input FIFO to the C array 38. A label that specifies the spatial bin number, from 0–255, is fed through an accumulator array address FIFO 40. The address FIFO 40 specifies the address in the C array 38 at which the current pixel, possibly mapped through the look-up table 34, will be added to the current value of that C array location. After all of the pixels have been streamed, each C array location, representing one bin from 0–255, contains the sum of the grey values of all pixels in the image that were labelled with that bin number.

The computation of intensity and/or spatial histograms is effected, using the configuration described hereinbefore, during train-time and run-time processes according to the invention. The train-time process, as illustrated in the flow diagram of FIG. 4, involves initial steps 40 of computing an initial geometric partitioning model for the golden sample of the given circular object. As discussed in detail hereinbefore, the geometric partitioning in this illustrative embodiment involves partitioning the circular object into a plurality of concentric rings and sectors or bins. The partitioning results in each pixel of interest in the image of the circular object receiving a label from 0 to 255.

Pixels that are of no interest, i.e. which may be outside of the area being inspected, are assigned a value of zero and are ultimately collected in the zero location of the intensity and spatial histogram arrays. Additionally, in effecting geometric partitioning it may be desirable to specify and store a mask image with a value of zero for every pixel outside of the outer radius of the circular object under consideration. Any pixels having a zero value are "don't care" pixels and will be accumulated in the zero location or "don't care" array element of the C array during computation of the spatial histogram. Accordingly, the intensity and spatial histograms are constructed using the configuration detailed with respect to FIG. 3.

During the training process it may be desirable to, optionally, adjust the offset 42 of the sectors or bins in order to optimize the annular offset of any given ring. Train-time is a good opportunity to make adjustments to the offset so as to optimize the efficacy of the registration and inspection process to get the most out of the run-time process. Thus, train-time is a good opportunity to analyze the spatial histogram of each ring and rotate the sectors in any given ring by adding offset to the origin of the first sector of the ring. Offset would be added, i.e. the ring rotated until the histogram for the ring has the most variation from bin to bin.

The optional process of analyzing the spatial histogram to optimize offset 42 is carried out by an iterative process at train-time wherein the angular offset is initially set to be zero. The spatial histogram is computed using the zero offset and the result is stored. The offset is then increased by one, the spatial histogram re-computed and stored, iteratively until the maximum offset is reached (the maximum is the angular extent of the given sector, i.e. the angular width of the sector). By computing the standard deviation of each stored spatial histogram at each increment of offset, an annular offset can be selected which yields the highest standard deviation and hence is the optimal offset presenting the most grey level variation bin to bin. Then, the ring that has the highest standard deviation of the reference angular offset spatial histogram can be selected as the reference ring, i.e. having the optimal or reference offset. All other rings can then be offset from the reference ring by the amount of the reference offset.

Another optional step that can be effected at train-time is changing of the ring width 44 or radial offset of the ring(s) in order to concentrate the histogram generation in regions where there is the most relevant information for inspection of defects or for determination of rotation angle. In practice, this option is less likely to be undertaken since it is preferred to design the rings so that the sectors or bins have approximately the same number of pixels, as discussed hereinbefore.

After the optional optimization(s) 42, 44, it may be necessary to re-store the modified geometric configuration or partition model and/or to recompute and re-store a final spatial histogram based on the modified model.

After final generation of the final spatial histogram, a summation histogram is computed 46. The summation histogram is a histogram in which all of the sectors or bins in a ring are summed to provide a ring based spatial histogram in which each bin represents one ring. The summation histogram is stored as a separate array in memory, apart from the E array and C array, and is used for a coarse comparison in the run-time process. At the end of the train-time process the spatial histogram array, the intensity histogram array and the summation histogram array are resident in memory for use in the run-time process as described hereinafter.

The run-time process involves many steps similar to train-time steps except that the step is performed with respect to an object under inspection, as opposed to a defect free, golden sample. Many of the steps are virtually identical to train-time steps and effected to obtain data for comparison against train-time data.

Figure 5:
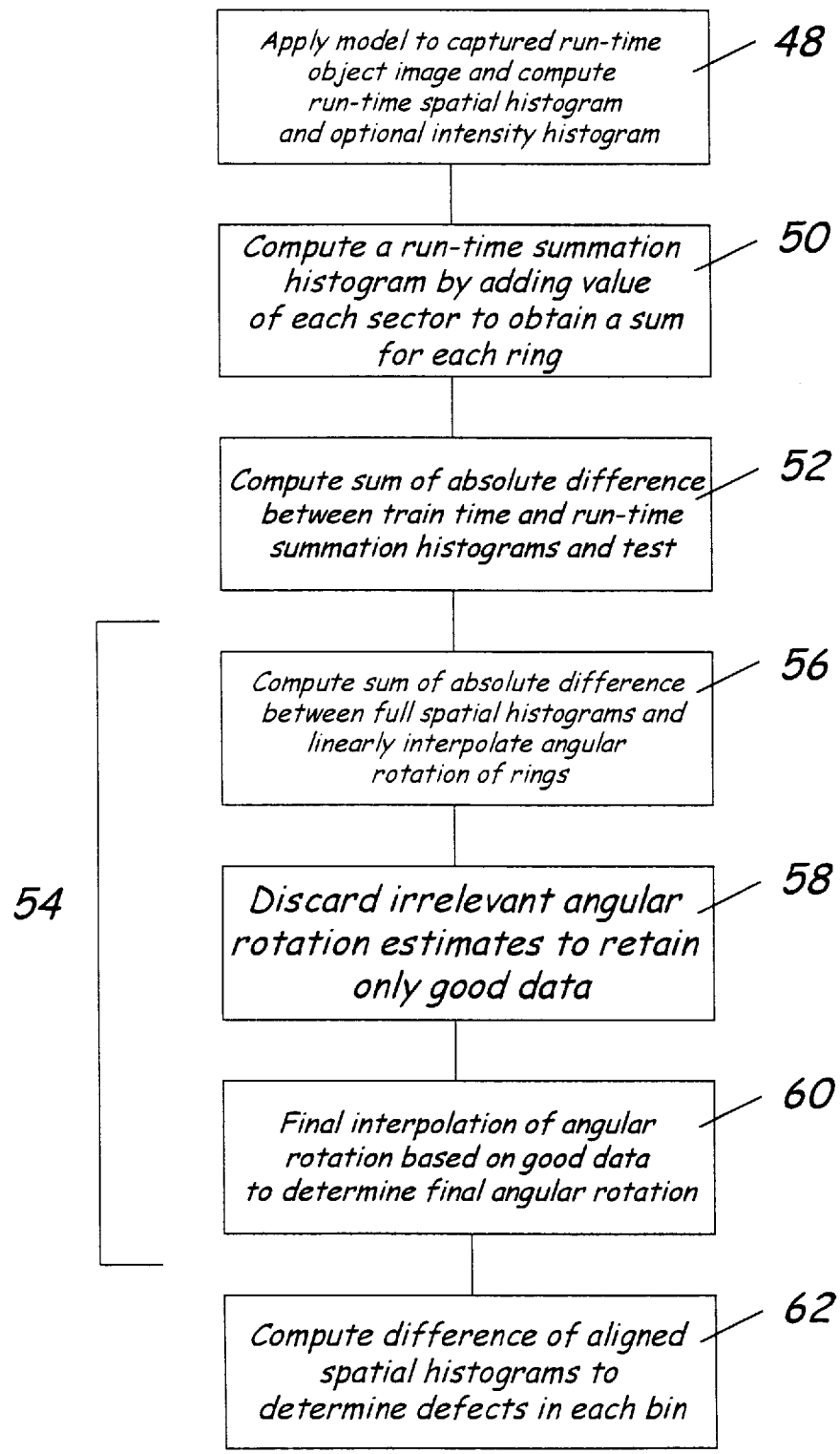
FIG. 5 is a flow diagram of a run-time process of the single step coarse registration and inspection of circular objects according to the invention.

The flow of the run-time process is generally illustrated in FIG. 5 and initially involves applying 48 the stored, final train-time geometric partition model to the captured image of a circular object being inspected, and computing a run-time spatial histogram. It is an option, that the mechanism can be implemented to include a run-time intensity histogram computation or not (if not there is also no need to compute a train-time intensity histogram). The intensity histogram is useful to provide an initial coarse inspection for defects.

If a run-time spatial and intensity histogram are to be computed, the run-time image should be masked using the mask specified and stored during the training process. Then, the stored train-time geometric partitioning model is applied to the masked out run-time image. Subsequently, a run-time spatial histogram and an intensity histogram of the masked image are computed.

A summation histogram is then computed 50. This is essentially the same as the step of computing the train-time summation histogram, described hereinbefore, but it applies to the run-time image. The run-time spatial histogram and summation histogram (and optionally the run-time intensity histogram) are stored for comparison with their train-time counterparts.

The optional run-time intensity histogram is used for comparison purposes against the train-time intensity histogram. Again, it may be desirable to compute the run-time intensity histogram to provide a front-end, coarse check or estimation of run-time defects to determine at the outset whether to continue or abort the process. It may also be desirable to compute the intensity histogram at train-time so as to have the option of using it at run time in certain applications.

Likewise, the run-time summation histogram is used for comparison purposes against the train-time summation histogram. Comparison of both types of histograms, e.g. spatial and intensity, is effected by computing 52 the sum of the absolute difference, as known in the art, between the two summation histograms, the partial spatial histogram corresponding to each ring (and optionally the two intensity histograms).

Given TA[I] and RA[I] a partial summation, $S_k$, can be computed as:

$$\sum_{i=1}^{n} |TA[mod(i+k, n)] - RA[i]| \qquad \text{Eq. (7)}$$

where: TA is the train-time histogram (spatial or intensity); RA is the run-time histogram (spatial or intensity); i is the bin index; $S_k$ is the kth sum of the absolute difference; and mod(x,n) represents the value x modulo n.

If $S_k$ is equal to zero it means that there is a perfect match between the train-time image and the run-time image. A perfect match is not likely to occur given the reality of subtle differences in even virtually identical samples. Accordingly, a threshold of acceptability is subjectively determined as a function of the application and/or relative levels of difference are subjectively determined.

For the summation and intensity histograms, it should be appreciated that the histograms are independent of rotation angle, thus k will equal zero. Therefore, only $S_0$ is meaningful. If the sum of absolute difference, S, between the two summation histograms (and/or the intensity histograms) is very high (or extraordinarily exceeds the threshold of acceptability), the two samples are substantially different, i.e. the inspected object is of a different type than the trained object and should result in rejection of the inspected object. Alternatively, the samples are the same type but some gross defect on the run-time sample justifies rejection of the inspected object(s).

If S is low, in the case of the intensity histograms, the sum of the absolute difference is low and computation of the difference between the two histograms should be stored for later use. It should be noted that where the intensity histogram is optionally used, computation of the sum of the absolute difference between the two intensity histograms should be computed before the computation of the sum of the absolute difference between the two summation histograms.

If S is low, in the case of the summation histograms, the sum of the absolute difference is low and computation of the difference between the two summation histograms yields a difference between each bin which provides a global defect count estimate for the ring corresponding to that bin in the summation histogram. Thus a coarse comparison for defects is effected.

After the coarse comparison undertaken by computing the sum of the absolute difference of the summation and intensity histograms, which might identify problems early in the run-time process, several steps 54 are performed to determine the final estimated rotation angle or angular displacement of the object being inspected.

A full blown or exhaustive sum of absolute difference between the two full spatial histograms is computed 56. Each ring is analyzed separately, by parabolic fitting as known in the art, to determine a comparative angular displacement or estimate of the angular displacement of each ring relative to the rings of the train-time image, as illustrated in greater detail in FIG. 6. The exhaustive sum of the absolute value difference for each ring is computed 66 by successively increasing the offset by one, starting at zero and increasing successively to the full circumference of the ring, i.e. the number of bins minus one.

To determine a substantially accurate comparative angular displacement of each of the rings, it is necessary to determine the actual offset of each of the bins in each of the rings. That is, it is necessary to determine the amount of angular displacement difference between the bins of the object being inspected and the bins of the train-time object. Accordingly, the sum of the absolute differences, as described in detail hereinbefore, is computed 66 (FIG. 6) for each offset in each ring separately. There are as many sum of the absolute difference ("SAD") results for each ring as there are bins in the ring. The SAD results, one for each bin in a respective ring, are then sorted 68 from smallest to largest to facilitate analysis of a set of results for the ring.

A "low" value for a SAD result is determined empirically based on the particular application 70. The selected "low" value for a SAD result is used to define a threshold value and is generally a function of the level of accuracy required in the system for a given application.

Subsequently, the sorted set of SAD results for a ring is analyzed 72 to determine if there is a single result that is less than or equal to the threshold value. If there is only a single result less than or equal to the threshold value, the single offset corresponding to that single result is determined to be, and stored 74 as the offset for bins in that ring.

If it is determined during analysis of the set of SAD results that there are two or three low results from contiguous bins then an interpolation is effected using the offsets corresponding to the two or three contiguous bins. The interpolation in this situation, in this illustrative embodiment, is effected using a parabolic fit, as known in the art, of three offsets. The actual parabolic fitting involved requires three points or low results, so if only two results from contiguous bins are determined to be below the threshold, these two results and the lowest of the next or previous result will be used in the parabolic fit. Of information derived in the parabolic fit, the x-coordinate information is the only information used and is determined to be the offset to be used in translating to the appropriate range of angles as described hereinafter. The value of the interpolated offset is stored as the offset for the ring.

If the sorted set of SAD results includes multiple non-contiguous groups including groups of two or three contiguous lows, then a number of "candidates" for offsets for that ring are determined. Any single non-contiguous result is stored as a candidate. A parabolic fit interpolated offset, computed as described hereinbefore, from each group of contiguous SAD results is stored as a candidate for offset for the ring. Accordingly one offset or comparative angular displacement for a ring, or a plurality of candidates for comparative angular displacement for a ring are stored for further processing.

For each estimate of comparative angular displacement for a ring, an estimate of actual angular displacement, and a range of angles, for each ring of the object being inspected is determined. The range of angles is determined by multiplying the estimate of comparative angular displacement(s) determined by the analysis of the spatial histograms focussing on the individual rings, i.e. as illustrated and described with respect to FIG. 6, by the angular resolution of a bin or sector for a given ring, i.e. 360 degrees divided by the number of bins in the ring. The estimate is determined by adding in the angular reference offset for that ring, as determined in geometric partitioning. Thus the estimates of comparative angular displacement for the ring(s) and the range of angles where the start of each respective ring is, have been determined for each ring.

Figure 6:
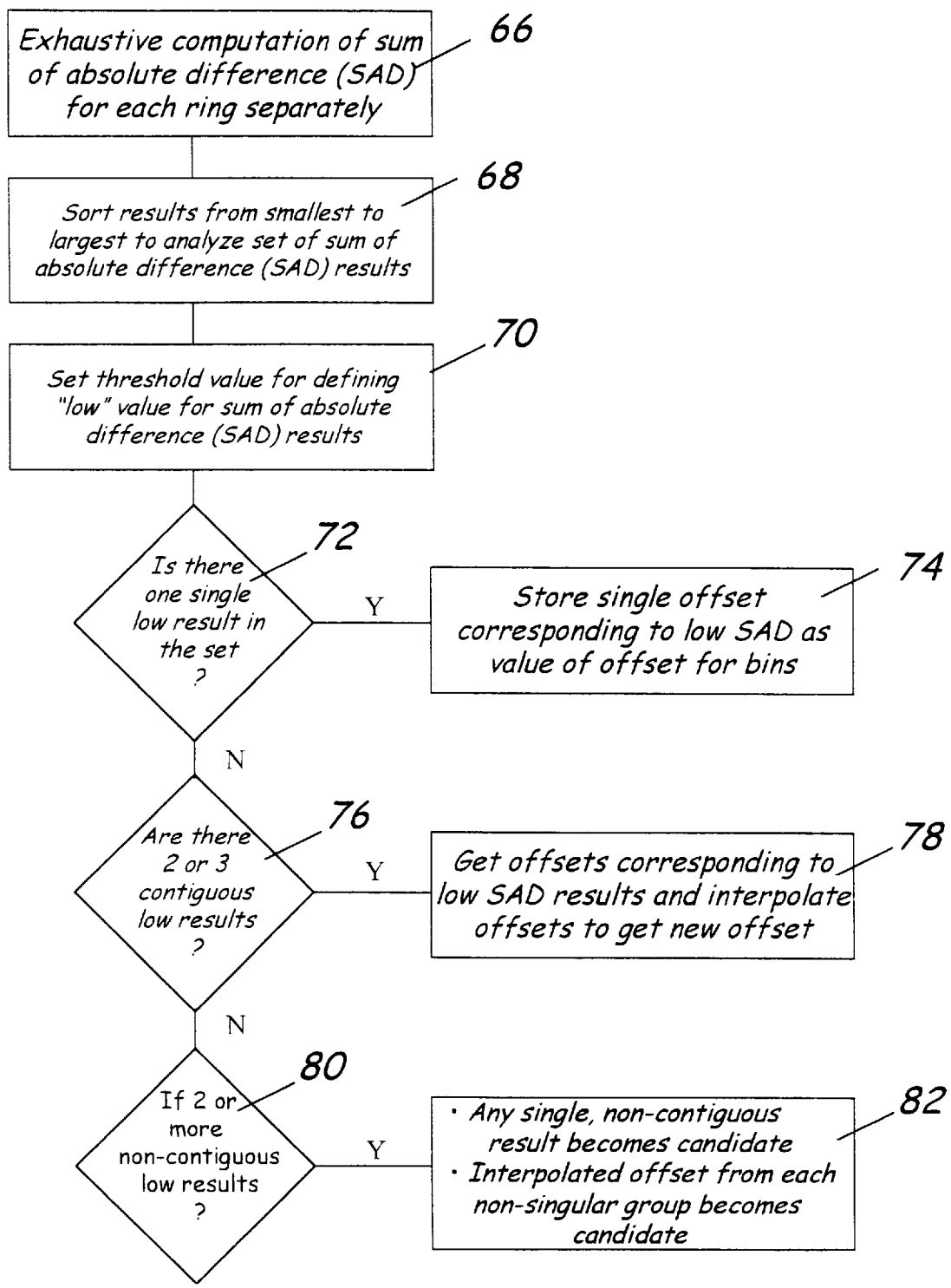
FIG. 6 is a flow diagram of a process for effecting determination of angular displacement of a run-time object in the run-time process of FIG. 5.

As described and illustrated in FIG. 6, there may be more than one candidate for angular displacement. Furthermore, some of the information obtained in determining the angular displacement(s) of the individual rings may not be valid and/or may be inconsistent with other information. Therefore, it is desirable to prune or discard 58 (FIG. 5) any gross mismatches from the set of angular displacement estimates for the individual rings. The values to be discarded are determined by analyzing the set of estimates to determine overlapping estimates, i.e. estimates that share some portion of a range of angles, and eliminating from the set all outliers, i.e. candidates or estimates that lie outside the overlapping region of the overlapping estimates.

A final determination 60 (FIG. 5) can then be effected using presumably valid data kept after pruning, by averaging the results from the various rings. The final determination provides the final estimate of the angular displacement of the run-time object based on the estimates of angular displacement for each ring. The final estimate is the estimate of angular displacement for the object being inspected and is used to compensate or align the run-time image with the train-time image.

After the angular displacement of the object being inspected is determined a fine, or less coarse, comparison between the spatial histogram of the run-time image and the spatial histogram of the train-time image is effected by computing 62 (FIG. 5) a difference of the aligned spatial histograms. This fine comparison provides an estimate of defects in each sector/bin and effects the final inspection. Two alternative methods can be used to determine defects in each bin. The choice of method presents a tradeoff between speed and accuracy.

A first method is a somewhat coarse but fast defect detection method that computes the difference between the aligned spatial histogram to estimate defects in each ring. The angular offset is determined for a selected number of bins. The angular offset for the rings is equal to the compensation angular offset designed into the geometric partition model minus the estimated angular displacement determined for the respective rings, divided by the angular resolution of the angular bins for this ring, i.e. 360 degrees divided by the number of bins in the respective ring(s). Then, the difference between the train-time spatial histogram bins related to the ring and the offset run-time spatial histogram bins related to the ring is computed. The limited number of data processed, in accordance with the selected number of bins and associated rings, accounts for the speed of this first method.

A second final defect detection method has greater detection accuracy but is slower than the first method. In the second method, the run-time spatial geometric partition model is recomputed using an angular reference offset for each ring which is a closest integer equal to the estimated angular displacement divided by the angular resolution of that ring. A run-time spatial histogram of the entire image is then computed using the re-computed run-time spatial model. The difference between the run-time spatial histogram and the train-time spatial histogram is then determined as discussed hereinbefore, resulting in a difference histogram. This method is relatively slower than the first due to the computation of the entire spatial histogram and the necessity to determine the difference relative thereto.

After the defect detection computations, the information obtained in the difference histogram can be recorded, interpreted and acted upon, and inspected objects can be classified accordingly. A maximum value of the defects can be computed along with a sum of all difference values.

Similarly, a mean difference value can be determined by dividing the sum of all difference values by the number of bins.

If the sum of the absolute value of the intensity or summation histograms, as determined in the initial coarse comparison, is low and the maximum value of the defects is low and close to the mean difference value the sample has effectively no defects and is acceptable.

If the sum of the absolute value of the intensity or summation histograms, as determined in the initial coarse comparison, is low and the maximum value of the defects is low but substantially different from the mean difference value, it may indicate that the sample has non-uniform low level differences and the sample can be accepted and/or reported as having minor localized defects.

If the sum of the absolute value of the intensity or summation histograms, as determined in the initial coarse comparison, is low and the maximum value of the defects is high but substantially different from the mean difference value, it may indicate that the sample has major localized defects and should be rejected.

If the sum of the absolute value of the intensity or summation histograms, as determined in the initial coarse comparison, is medium, i.e. 3–4 times the threshold value, and the maximum value of the defects is high but close to the mean difference value, the sample can be reported as being erroneous, because the rings are overall substantially different.

It should be appreciated that the mechanism described hereinbefore is extensible and can be implemented in other embodiments. For example, statistical training can be used so that the stored histograms or signatures do not represent a single instance of a good sample, but the average signature of a range of good samples. In addition, statistical training can be used to provide standard variation information for each computed signature. This standard deviation, or scaled quantities of these deviations, can be used as thresholds to decide whether a set of signatures from a run-time sample matches a given stored template signature.

Furthermore, multiple statistical histograms or signatures of various models can be used as an input to a neural net to provide automatic classification of a given run-time sample against many known templates. In this mode, the mechanism is not looking for defects but is sorting randomly oriented objects into bins.

It should be appreciated that, although the sum of absolute difference is used as a difference metric, other difference metrics can be used, such as mean squared error, normalized correlation or the like.

It should be appreciated that although the computations of intensity and spatial histograms described were effected seemingly in seriatim, the operations can be effected substantially simultaneously depending upon the hardware platform or configuration and its capabilities.

Although described hereinbefore as a single step registration and inspection mechanism, it should be appreciated that the invention described can be used as a first stage to more local registration and inspection algorithms, providing a coarse estimate of the angular position and spatial localization of areas with defects. Once the coarse rotation is determined, a traditional method such as a polar search method known in the art can be used on an extremely small window to determine exact rotation. Similarly once the coarse location of the defects is determined, a higher resolution pixel comparison inspection can be performed. Although the traditional, much slower method is used as a second stage, they can be applied on only limited, very small areas and the overall performance of the system will be significantly greater as opposed to a system that directly uses the traditional, known method over the entire area.

While the use of a two pass initial geometric partitioning computation is described herein to effect overlapping of successive rings to enhance the robustness of the mechanism and compensate for any off-center of the part being inspected (or trained), it will be appreciated that a somewhat less robust mechanism may be effected just the same without using the overlapping rings, yet without losing the advantages associated with the single step registration and inspection process.

Although the geometric partition model developed in inspecting circular objects according to the invention described hereinbefore comprises 256 spatial bins constituted by concentric circular rings divided into sectors wherein the number of sectors and thickness of the rings are determined so that the approximate number of pixels in each region is the same, it will be appreciated that fewer or greater spatial bins can be implemented, and that the bins can be configured as other than concentric rings divided into sectors. For instance, the accuracy of the angle determination and defect discrimination can be increased by dividing up the circular object into different, smaller spatial zones, computing the 256 model projection on each of the smaller spatial zones and splicing the result together to effectively obtain a 512 or 1024, or lesser or greater bin model projection of the entire circular object.

Although a reasonable precision for angular displacement is approximately 15 degrees, and the number of sectors or bins in the outermost ring is selected accordingly, it will be appreciated that the geometric partition model of the circular object can be constructed to take into consideration features of the circular object under inspection. For instance, if there is no information in an area corresponding to an outer concentric ring, that area can be designated as a single bin (effectively with "don't care" values). Likewise, inner rings or portions of the circular object can be designated as a single bin if there is effectively no information therein requiring inspection. If there is considerable detail in the outermost ring of the circular object, depending upon the application or object being inspected, it may be desirable to construct a model wherein the outermost ring comprises a large number of bins.

While a particular implementation is described herein involving Cognex vision systems and particularly Cognex's VC1 or VC3 vision system specific processor, it will be appreciated by those skilled in the art that alternative hardware can be implemented such as Motorola microprocessors, general purpose microcomputers or the like, or the invention can be implemented in software running on other platforms, or in a combination of hardware and software configured to effect the mechanisms described hereinbefore.

While the illustrative embodiment described hereinbefore includes computation of an intensity histogram at train-time and optional use of the intensity histogram at run-time, it should be appreciated that computation of the intensity histogram can be dispensed with altogether, or the intensity histogram can be computed at train-time and used at run-time or optionally invoked at run-time as a function of run-time speed considerations or as a function of the type of objects and process, or based on similar considerations.

Although the invention has been shown and described herein with respect to an illustrative embodiment thereof, it should be appreciated that the foregoing and various other changes, omissions and additions in the form and detail thereof can be made without departing from the spirit and scope of the invention.

What is claimed is:

1. A method of inspecting a circular object to effect angular displacement determination and defect detection, using a machine vision system capable of storing a train-time image of a standard sample of said circular object and capturing a run-time image of said circular object to compare against train-time pixel information, said method comprising the steps of:

providing a geometric partition model of said circular object, said geometric partition model comprising spatial bins, each of said spatial bins comprising a plurality of pixels, each of said plurality of pixels being assigned one of a plurality of said labels corresponding to a respective spatial bin;

generating a train-time spatial histogram of said train-time image in accordance with said geometric partition model wherein each pixel in said train-time image is assigned a train-time spatial histogram label selected from one of said plurality of labels, said train-time spatial histogram comprising a plurality of train-time sums of grey level values of pixels of said train-time image in respective ones of said spatial bins;

generating a run-time spatial histogram of said run-time image in accordance with said geometric partition model wherein each pixel in said run-time image is assigned a run-time spatial histogram label selected from one of said plurality of labels designating said respective one of said spatial bins, said run-time spatial histogram comprising a plurality of run-time sums of grey level values of pixels of said run-time image in respective ones of said spatial bins;

determining an estimated angular displacement of said run-time image relative to said train-time image to provide an aligned run-time spatial histogram in accordance with said geometric partition model, that is aligned with said train-time spatial histogram in accordance with said estimated angular displacement; and comparing said train-time spatial histogram and said aligned run-time spatial histogram to determine a difference therebetween to provide an estimate of defects in said circular object.

2. The method of claim 1 wherein said step of determining said estimated angular displacement is performed by computing a plurality of sums of absolute differences between said train-time spatial histogram and said run-time spatial histogram.

3. The method of claim 1 wherein said step of determining an angular displacement further includes the step of analyzing selected ones of said plurality of spatial bins to determine respective angular offsets of said selected ones of said plurality of spatial bins to derive said estimated angular displacement of said run-time image in accordance with at least some of said respective angular offsets.

4. The method of claim 1 further comprising a coarse defect detection operation comprising the steps of:

generating a train-time intensity histogram of said train-time image in accordance with a don't care mask, wherein said train-time intensity histogram comprises a plurality of train-time intensity bins each identified by a respective train-time bin address that corresponds to a respective run-time grey level value, and each of said plurality of train-time intensity bins includes a train-time bin value that is equal to a number of pixels of said train-time image that have a train-time grey level value corresponding to said respective train-time bin address;

generating a run-time intensity histogram of said run-time image in accordance with said don't care mask, wherein said run-time intensity histogram comprises a plurality of run-time intensity bins each identified by a respective run-time bin address that corresponds to a respective run-time grey level value, and each of said plurality of run-time intensity bins includes a run-time bin value that is equal to a number of pixels of said run-time image that have a run-time grey level value corresponding to said respective run-time bin address;

computing a sum of absolute differences between said traintime intensity histogram and said run-time intensity histogram;

selecting a threshold of acceptability of said sum of absolute differences between said train-time intensity histogram and said run-time intensity histogram; and classifying said circular object as a function of said threshold of acceptability and said sum of absolute differences between said train-time intensity histogram and said run-time intensity histogram.

5. The method of claim 1 further comprising a coarse defect detection comprising the steps of: after said steps of generating said run-time spatial histogram and said train-time spatial histogram, computing a train-time summation histogram by summing selected ones of said train-time spatial bins;

computing a run-time summation histogram by summing selected ones of said run-time spatial bins;

computing a sum of absolute differences between said train-time summation histogram and said run-time summation histogram;

selecting a threshold of acceptability of said sum of absolute differences between said train-time summation histogram and said run-time summation histogram; and classifying said circular object as a function of said threshold of acceptability and said sum of absolute differences between said train-time summation histogram and said run-time summation histogram.

6. The method of claim 1 wherein said geometric partition model comprises a plurality of concentric rings, and each of said plurality of concentric rings is divided into a plurality of sectors, each of said sectors corresponding to a respective one of said plurality of spatial bins.

7. The method of claim 1 wherein each of said plurality of spatial bins comprises approximately an equal number of pixels.

8. The method of claim 4 wherein said don't care mask of said train-time image is stored during train-time and prior to said coarse defect detection operation, and wherein said run-time image is masked according to said don't care mask to select information required in generating said run-time intensity histogram and said run-time spatial histogram.

9. The method of claim 6 wherein a selected offset is computed for each of said plurality of concentric rings, and said selected offset is added to a starting point of a first sector of each of said plurality of concentric rings to increase angular resolution of said estimated angular displacement determined with respect to said run-time image.

10. The method of claim 6 wherein said step of computing said geometric partition model involves computing a first model and a second model, said second model including at least some overlapping portions with said first model, and said steps of generating a train-time spatial histogram, generating a run-time spatial histogram, and determining an estimated angular displacement of said run-time image relative to said train-time image are performed respectively with respect to each of said first model and said second model and respective information relating to said first model is averaged with respective information relating to said second model prior to comparing said train-time spatial histogram and said aligned run-time spatial histogram to determine a difference therebetween.

11. The method of claim 6 wherein said plurality of sectors comprises 256 sectors, and said train-time spatial histogram and said run-time spatial histogram are each generated in a respective array having a plurality of array elements including a respective array element to store information for each of said plurality of sectors.

* * * * *